United States Patent

Hori et al.

[11] Patent Number: 6,142,117
[45] Date of Patent: Nov. 7, 2000

[54] COMBUSTION CHANGEOVER CONTROL FOR ENGINE

[75] Inventors: Toshio Hori; Shinji Nakagawa, both of Ibaraki; Tomohiko Takahashi, Kanagawa; Takahiro Yoshino; Hatsuo Nagaishi, both of Yokohama, all of Japan

[73] Assignees: Nissan Motor Co., Ltd., Yokohama; Hitachi, Ltd., Tokyo, Japan

[21] Appl. No.: 09/215,250

[22] Filed: Dec. 18, 1998

[30] Foreign Application Priority Data

Dec. 19, 1997 [JP] Japan .................................. 9-351493

[51] Int. Cl.⁷ ............................ F02M 25/07; F02B 17/00
[52] U.S. Cl. ...................... 123/295; 123/305; 123/568.21
[58] Field of Search .................................. 123/295, 305, 123/568.11, 568.21

[56] References Cited

U.S. PATENT DOCUMENTS

| | | | |
|---|---|---|---|
| 5,749,334 | 5/1998 | Oda et al. ............................... | 123/305 |
| 5,848,580 | 12/1998 | Mashiki .................................. | 123/295 |
| 5,896,839 | 4/1999 | Togai ..................................... | 123/295 |
| 5,979,396 | 11/1999 | Yasuoka ................................. | 123/295 |
| 6,006,717 | 12/1999 | Suzuki et al. .......................... | 123/295 |

FOREIGN PATENT DOCUMENTS

7-269416  10/1995  Japan .

*Primary Examiner*—Willis R. Wolfe
*Attorney, Agent, or Firm*—Foley & Lardner

[57] ABSTRACT

An engine control system for an internal combustion engine comprises a combustion system for changing over a combustion mode from a first mode such as a stratified charge combustion mode to a second mode such as a homogeneous charge combustion mode, and an EGR system for controlling an EGR flow to the engine with an EGR control valve. A controller calculates a delayed target equivalent ratio which varies gradually from a first ratio for the first mode to a second ratio for the second mode, and further calculates a modified target equivalent ratio in consideration of an amount of an EGR gas. The controller determines the combustion changeover timing by monitoring a parameter based on the modified target equivalent ratio to take account of the influence of the EGR gas.

19 Claims, 4 Drawing Sheets

COMBUSTION CHANGEOVER CONTROL FOR ENGINE

BACKGROUND OF THE INVENTION

The present invention relates to technique for controlling combustion changeover in an internal combustion engine among a plurality of combustion modes having different combustible ranges of an equivalent ratio (fuel air ratio/ theoretical fuel air ratio), and more specifically to system and method for controlling a combustion changeover timing for an engine equipped with an EGR (Exhaust Gas Recirculation) system.

Recently, the technique of in-cylinder direct fuel injection in a spark ignition engine such as gasoline engine is under development to improve the fuel efficiency and emission performance by selectively using stratified charge combustion and homogeneous charge combustion.

In a low and medium load region, a control system for such a type operates an engine in a stratified charge combustion mode by injecting fuel directly into a combustion chamber during the compression stroke so as to produce a stratified combustible mixture closely around the spark plug. The thus-achieved stratified combustion enables stable combustion with an ultra lean mixture, and hence significant improvement in the fuel efficiency and emission control performance of the engine.

In a high load region over a predetermined engine load, the engine is operated in a homogeneous charge combustion mode to meet a demand for higher output torque. In the homogeneous combustion mode, fuel is injected during the intake stroke so as to produce a homogeneous air fuel mixture. (In some examples, a fuel injection valve is provided separately in an intake port.)

The control system changes over the combustion mode between the stratified combustion mode and the homogeneous combustion in accordance with one or more engine operating conditions.

To reduce NOx emission, an engine for a vehicle is generally equipped with an EGR system for recirculating part of the exhaust gases from the exhaust system to the intake system. A desired target EGR rate is not equal between stratified combustion and homogeneous combustion. Therefore, there is a need for switching the target EGR rate in accordance with a changeover of the combustion. In general, EGR is carried out in the stratified charge combustion mode and homogeneous stoichiometric combustion mode while EGR is cut off in a homogeneous lean combustion mode to maintain stable combustion. An EGR control system of such a type is shown in Japanese Patent Provisional (Kokai) Publication No. 7(1995)-269416.

SUMMARY OF THE INVENTION

It is an object of the present invention to provide engine control apparatus and process capable of changing over a combustion mode in a smooth manner minimizing adverse influence of EGR.

To avoid torque shock in a combustion changeover from a first mode to a second mode, it is effective to vary an actual air fuel ratio gradually from a first ratio desired for the first mode to a second desired ratio for the second mode in response to a request for a changeover from the first mode to the second mode, and to perform a combustion changeover from the first mode to the second mode when the actual air fuel ratio reaches a predetermined level ensuring a stable combustion in the second mode. However, the air fuel ratio is not necessarily an adequate parameter for determining the timing of combustion changeover when the EGR gas is involved.

The actual EGR gas quantity only varies gradually due to a lag in action of the EGR valve, and a transportation lag (distance/velocity lag) of EGR gas. Therefore, to stop EGR after a combustion changeover from the stratified combustion mode to the homogeneous combustion mode is not advisable in view of the influence of a residual EGR gas on the combustion. Rather, it is desirable to stop EGR earlier in response to a combustion changeover request from the stratified mode to the homogeneous mode in order to lessen the influence of the residual EGR gas and to ensure the stability of homogeneous lean combustion.

However, even if an EGR valve is closed to stop EGR immediately upon receipt of a combustion changeover request from the stratified charge combustion to the homogenous charge combustion, the heavy EGR during the stratified charge combustion leaves behind a considerable amount of EGR gas. The residual EGR gas impairs the adequacy of the air fuel ratio as the parameter for determining the combustion changeover timing, and tends to cause a premature combustion changeover at too lean an air fuel ratio to maintain the combustion stability.

Therefore, the present invention aims to more accurately detect a combustion limit of a combustion mode such as the homogeneous lean combustion mode by monitoring a parameter reflecting an actual intake gas mixture condition of the fresh intake air and the recirculated exhaust gas, instead of the mere fuel air ratio, and thereby to change over the combustion in a timely manner.

The use of the air fuel ratio (or a variable such as TFBYA4 representing a fuel air ratio) as the monitored parameter tends to cause too early changeover to the homogeneous mode at such a lean fuel gas mixture ratio (at a point B shown in FIG. 4) as to degrade the stability of combustion, to increase the possibility of misfire and to cause hesitation and unwanted engine speed decrease. A delay from stoppage of EGR to a start of changeover of the air fuel ratio may be considered effective to eliminate the influence of the residual EGR gas. However, the delay is liable to retard the combustion changeover, to prolong the EGR shut-off period in the stratified combustion mode and to influence the emission control performance.

According to the present invention, an engine control apparatus or process is designed for an internal combustion engine equipped with a combustion system, such as an intake system and a fuel system, for changing over a combustion condition in the engine among a plurality of combustion modes in accordance with an engine operating condition, and an EGR system for recirculating part of exhaust gas to an intake air flow into the engine. The engine control apparatus or process comprises the following sections or steps.

A first section (or step) is for producing a first-mode-to-second-mode combustion changeover request signal (such as a step change in FSTR0) for requesting a changeover from a first combustion mode such as the stratified charge combustion mode to a second combustion mode such as the homogeneous charge combustion mode.

A second section (or step) is for varying an actual equivalent ratio (or an actual fuel air ratio), in response to the changeover request signal, gradually from a first desired ratio level for the first combustion mode to a second desired ratio level for the second combustion mode. For example, the actual equivalent ratio is varied by controlling an intake air quantity and a fuel supply quantity so as to achieve a calculated target equivalent ratio.

A third section (or step) is for calculating an EGR quantity of the EGR system.

A fourth section (or step) is for calculating a modified equivalent ratio in consideration of the EGR quantity.

A fifth section (or step) is for changing over the combustion condition from the first combustion mode to the second combustion mode in accordance with the modified equivalent ratio.

DETAILED DESCRIPTION OF THE INVENTION

Figure 1:
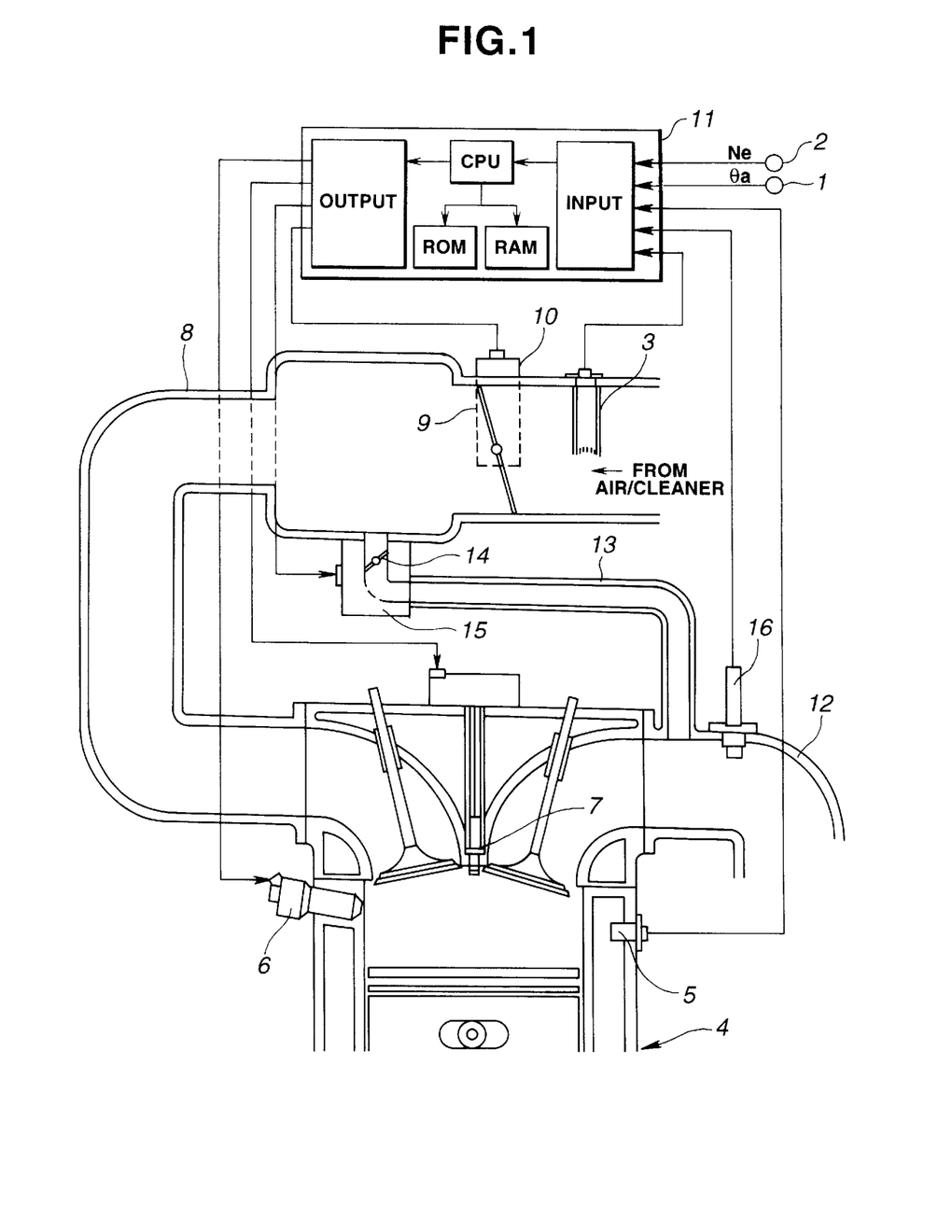
FIG. 1 is a schematic view of an engine system according to one embodiment of the present invention.

FIG. 1 shows an engine control system according to one embodiment of the present invention.

An accelerator position sensor 1 senses an opening degree (or a depression degree) of an accelerator pedal of a vehicle.

A crank angle sensor 2 of this example produces a position signal signaling each unit crank angle, and a reference signal signaling each cylinder stroke phase difference. The control system can determine the engine speed by measuring the number of pulses per unit time of the position signal, or measuring the period of occurrence of pulses of the reference signal.

An air flow sensor (or air flow meter) 3 senses an intake air quantity for an engine 4.

A water temperature sensor 5 senses the temperature of an engine cooling water.

The engine 4 is equipped with a fuel injector 6 and a spark plug 7 for a cylinder (or for each cylinder). The fuel injector 6 injects fuel directly into a combustion chamber of the engine 4 in response to a fuel injection control signal, and the spark plug 7 initiates ignition in the combustion chamber. A throttle valve 9 is disposed in an intake air passage 8 of the engine 4. A throttle control unit 10 is arranged to electronically control the opening degree of the throttle valve 9 with a throttle actuator such as a DC motor. The throttle valve 9 serves as an intake air metering valve for controlling a fresh intake air quantity to the engine 4. The fuel injector 6 is controlled in one of a stratified charge combustion mode and a homogeneous charge combustion mode. In the stratified combustion mode, the fuel injector 6 injects the fuel into the combustion chamber on the compression stroke to achieve stratified combustion with a very lean air fuel mixture. Under high load conditions, the fuel injector 6 is controlled in the homogeneous combustion mode, and injects fuel into the combustion chamber on the intake stroke to achieve homogeneous combustion to provide more power output.

An engine control unit 11 receives signals from the sensors to collect input information on engine operating conditions, and controls the opening degree of the throttle valve 9 with the throttle control unit 10, the fuel injection quantity (or fuel supply quantity) with the fuel injector 6 and the ignition timing with the spark plug 7 in accordance with the engine operating conditions. Specifically, the control unit 11 varies the fuel air ratio of the air fuel mixture supplied or produced in the engine widely by controlling the intake air quantity and the fuel injection quantity, and changes the fuel injection timing to change over the engine combustion mode between the stratified mode and the homogeneous mode.

In this example, the engine control unit 11 is a main component of a controller. The control unit 11 of FIG. 1 includes at least one computer including at least a central processing unit (CPU), a memory section having ROM and RAM and input and output sections.

The fuel injector 6 is a component of the fuel system of the engine 4, which in this example is the fuel injection system. The spark plug 7 is a component of the ignition system of the engine 4. The engine 4 is further equipped with the intake system constituted by the intake passage 8, the throttle valve 9 etc., the exhaust system including at least an exhaust gas passage 12 of the engine, and an EGR (exhaust gas recirculating) system connecting the exhaust system with the intake system.

The EGR system for the engine 4 comprises an EGR passage 13 connecting the exhaust passage 12 with the intake passage 8, and an EGR control valve 14 disposed in the EGR passage 13. An EGR control unit 15 is arranged to electronically control the opening of the EGR valve 14. In this example, the EGR control unit 15 comprises a stepper motor for accurately controlling the position of the EGR valve 14. The EGR control unit 15 varies the opening degree of the EGR valve 14 and thereby controls the amount of EGR.

The control system of this example further includes an air fuel ratio sensor 16 provided in the exhaust passage 12 of the engine, for sensing the air fuel ratio of the air fuel mixture by sensing a concentration of a predetermined component such as oxygen in the exhaust gas mixture.

The engine control unit 11 calculates a target intake air quantity from the accelerator opening θa and the engine revolution speed Ne, and controls the opening degree of the throttle valve 9 to achieve the target intake air quantity by delivering a drive signal to the throttle valve control unit 10. The engine control unit 11 further controls the actual equivalent ratio (proportional to the fuel air ratio) by controlling the fuel injection quantity in accordance with the intake air quantity. The engine control unit 11 further controls the opening degree of the EGR valve 14 by sending a drive signal (or EGR control signal) to the EGR control unit 15, and thereby varies the EGR condition of the engine 4. The control unit 11 activates EGR in a predetermined engine operating region (EGR region) to achieve a desired target EGR rate (EGR gas quantity/intake air quantity). The EGR region is expressed by the engine load (such as the accelerator opening θa or the fuel injection quantity), and the engine speed. Moreover, the engine control unit 11 calculates a parameter (such as a modified equivalent ratio) representing a fuel gas ratio of a fuel quantity to a total quantity of intake air and recirculated exhaust gas, and controls the combustion changeover timing in accordance with the parameter, as explained more in detail with reference to FIGS. 2 and 3.

Figure 2:
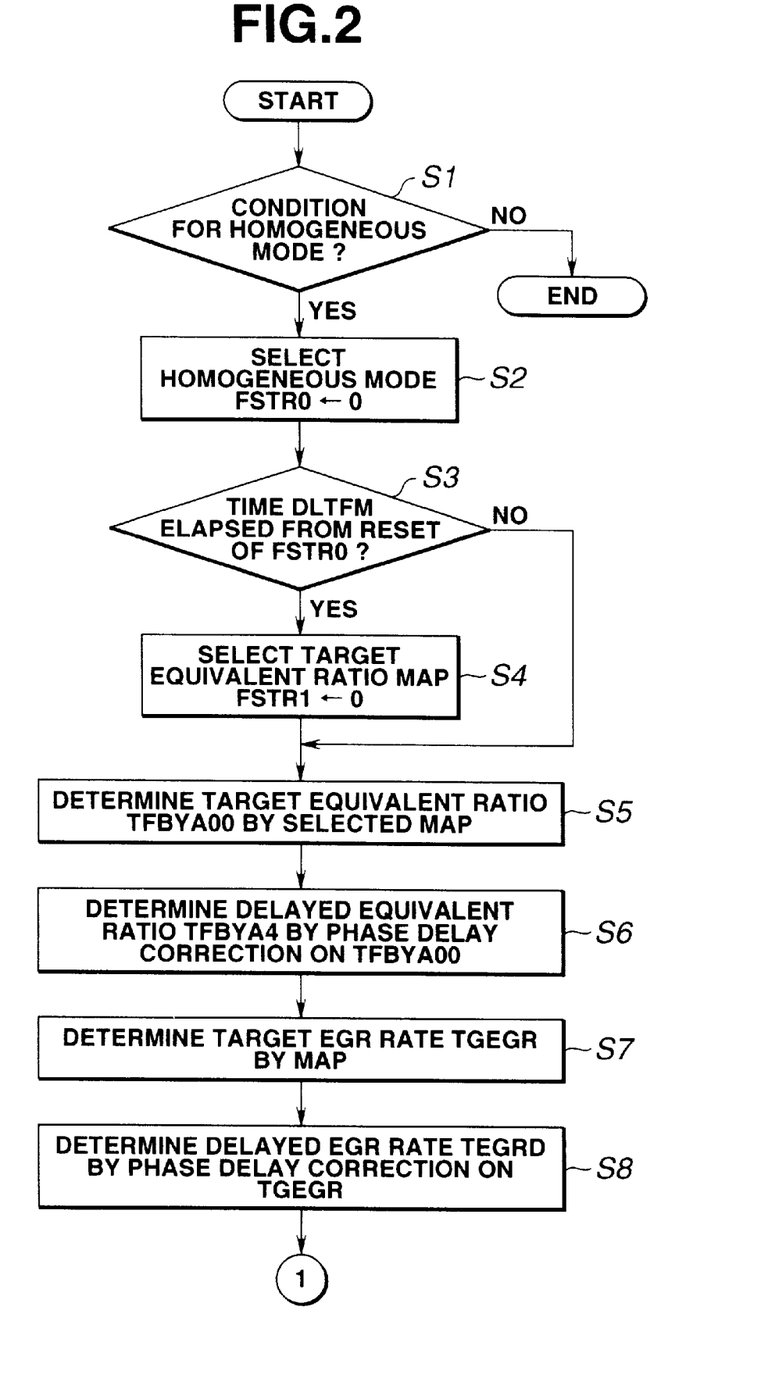
FIG. 2 is a flowchart showing a first section of a combustion changeover control routine performed by a control unit shown in FIG. 1.
Figure 3:
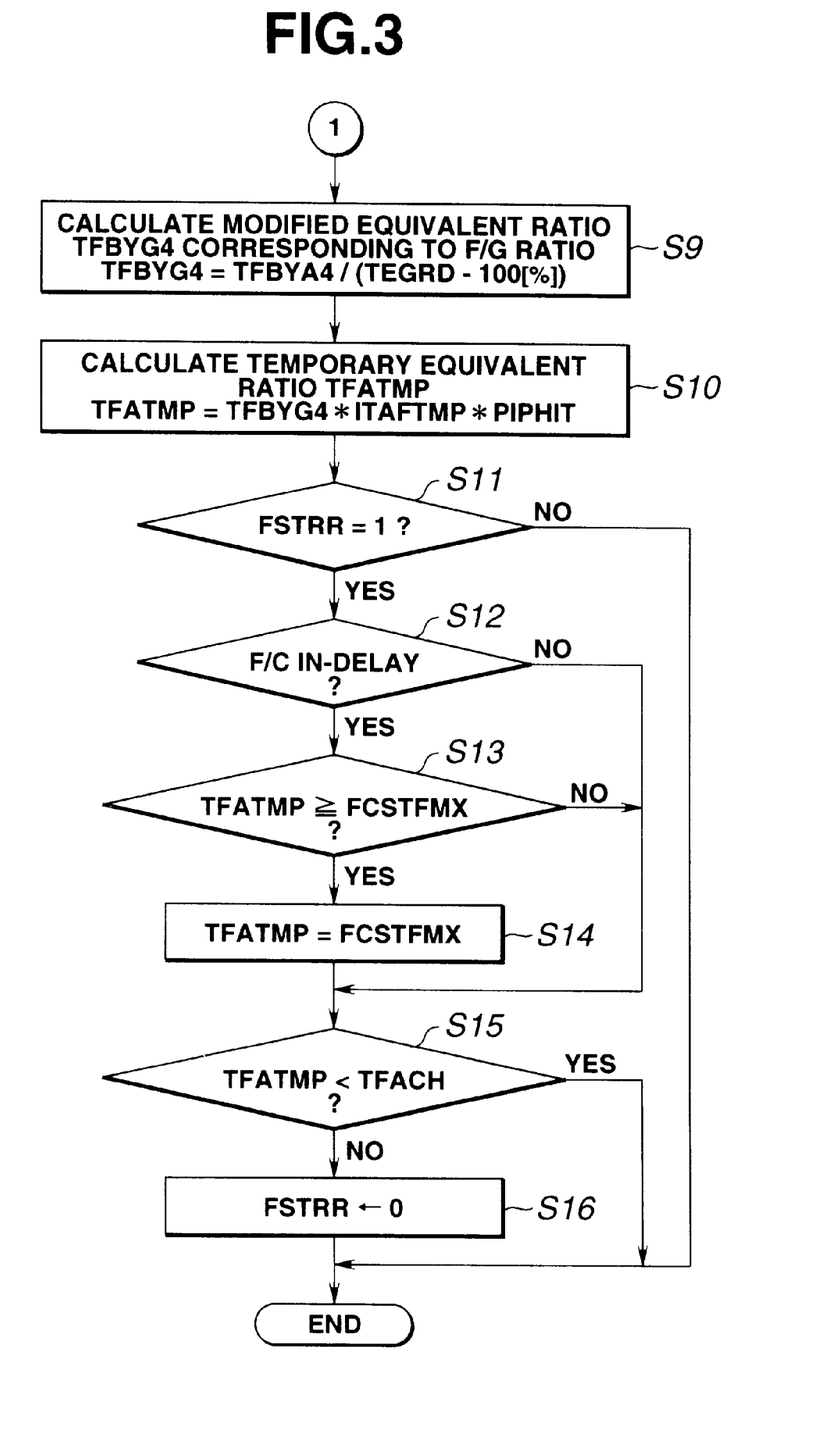
FIG. 3 is a flowchart showing a second section of the combustion changeover control routine shown in FIG. 2.

FIGS. 2 and 3 show a stratified mode to homogeneous mode changeover control process according to the embodiment of the present invention. In this example, the control routine of FIGS. 2 and 3 is performed at regular time intervals.

At a step S1, the control unit 11 judges whether a condition is satisfied for transition from the stratified charge combustion mode to the homogeneous charge combustion mode in accordance with one or more engine operating conditions such as the accelerator opening degree θa, the engine speed Ne and the engine cooling water temperature Tw. A U.S. patent application Ser. No. 09/104,359 filed on Jun. 25, 1998, based on Japanese Application No. 9-168419 discloses a similar judging step for selecting a desired target combustion mode. The disclosure of this U.S. Patent Application is hereby incorporated by reference.

Figure 4:
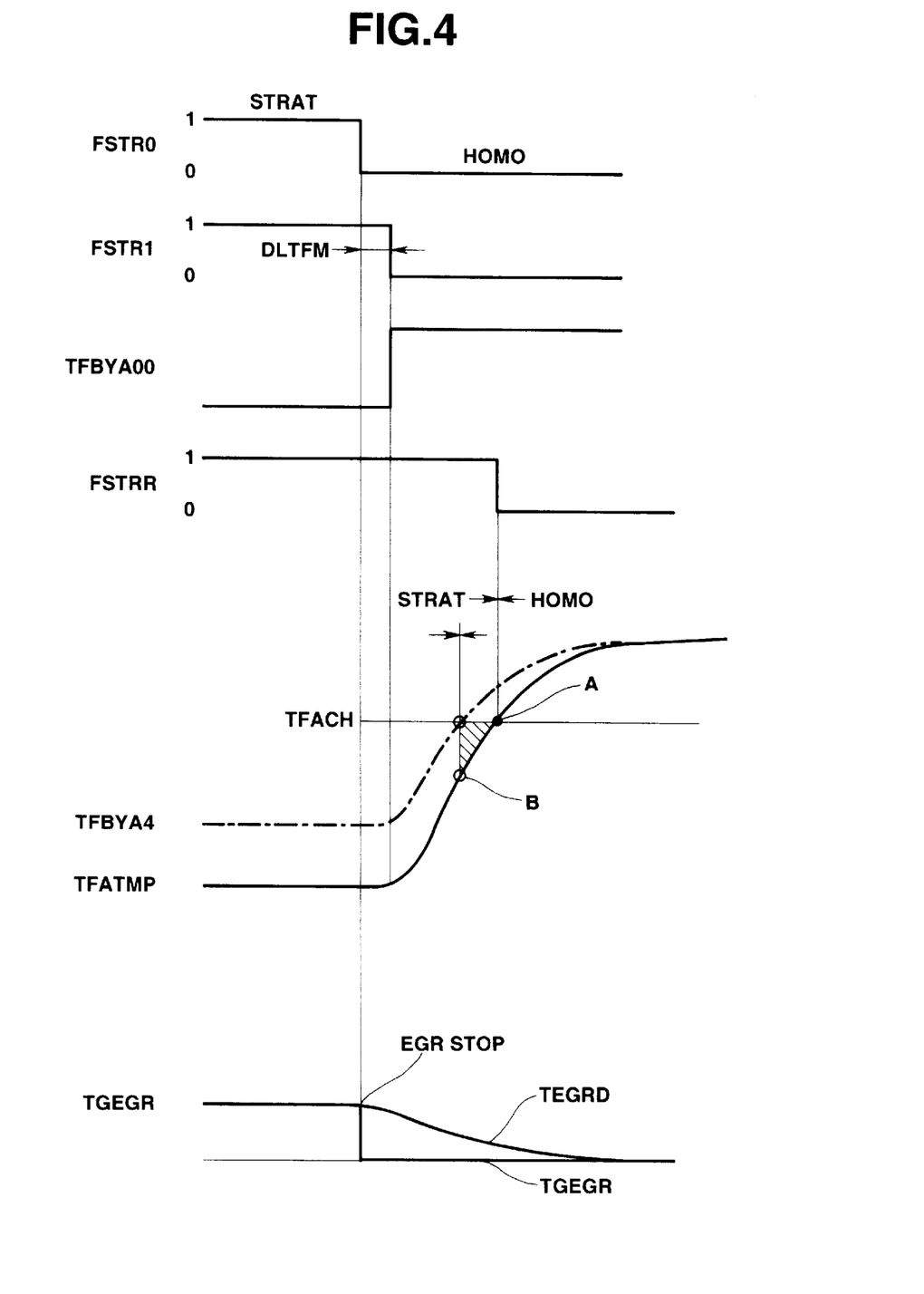
FIG. 4 is a time chart illustrating operations of the engine system according to the embodiment of the present invention.

If the condition for transition from the stratified charge combustion mode to the homogeneous charge combustion mode is satisfied, the control unit 11 proceeds from the step S1 to a step S2, and resets a combustion mode selection flag FSTR0 to zero as shown in FIG. 4. Thus, the control unit 11 selects, as a desired target combustion mode, one of the stratified combustion mode and the homogeneous combustion mode, and produces a combustion changeover request signal in accordance with the sensed engine operating conditions.

At a step S3 following the step S2, the control unit 11 determines whether a predetermined delay time DLTFM 30 has elapsed from a reset of the mode selection flag FSTR0 from 1 to 0, that is from the time point of generation of the stratified mode to homogeneous mode changeover request signal. Before the elapse of the delay time DLTFM, the control unit 11 jumps to a step S5, so that an equivalent ratio map selection flag FSTR1 remains equal to one to keep on a stratified mode equivalent ratio map. The control unit 11 proceeds to a step S4 on and after the elapse of the delay time DLTFM. At the step S4, the control unit 11 resets the equivalent ratio map selection flag FSTR1 to zero, as shown in FIG. 4, to select a homogeneous mode target equivalent ratio map instead of the stratified mode target equivalent ratio map.

The delay time DLTFM functions to delay a changeover of a desired target equivalent ratio TFBYA00 with respect to a changeover request in order to avoid influence from a response delay of the EGR system or a response delay of a vapor fuel control system.

At the step S5, the control unit 11 determines the desired target equivalent ratio TFBYA00 in accordance with engine operating conditions such as the engine speed Ne and a target torque tTc, by looking up a target equivalent ratio map selected from the stratified mode 20 target equivalent ratio map and the homogeneous mode target equivalent ratio map in accordance with the value of the target equivalent map selection flag FSTR1. For example, the target torque tTc is determined in accordance with the accelerator depression degree APS and the engine speed Ne. In the example shown in FIG. 4, the desired target equivalent ratio TFBYA00 is increased in a manner of a step change at the end of the delay time DLTFM. A U.S. patent application Ser. No. 08/804,454 discloses an engine control system for determining a target equivalent ratio and controlling the intake air quantity and the fuel injection quantity in accordance with the target equivalent ratio. The disclosure of this U.S. Application is hereby incorporated by reference.

At a step S6 following the step S5, the control unit 11 determines a delayed target equivalent ratio TFBYA4 by performing a phase delay correction on the desired target equivalent ratio TFBYA00. In this example, the delayed equivalent ratio TFBYA4 is give by:

$$TFBYA4 = FLOAD \times TFBYA00 + (1-FLOAD) \times TFBYA4(n-1)$$

In this equation, FLOAD is a weight coefficient for a weighted average, and TFBYA4(n-1) is a previous value of the delayed equivalent ratio. In this example, the weight coefficient FLOAD is determined in accordance with engine operating conditions.

With this phase delay correction, the control system can vary the equivalent ratio so as to keep pace with a lagging change of the intake air quantity. When the target equivalent ratio TFBYA00 is changed in response to changes in the engine operating conditions requiring a changeover of the combustion mode between the stratified combustion mode and the homogeneous combustion mode, the control system can change the fuel injection quantity with no or little delay in conformity with the change of the target equivalent ratio TFBYA00. However, the intake air quantity cannot change immediately because of a lag in movement of the throttle valve 9 and a lag attributable to the volume of the intake system. Therefore, the control system of this example determines the delayed target equivalent ratio TFBYA4 by the phase-delay correction so as to keep pace with the lagging change of the intake air quantity, and thereby controls the engine output torque smoothly specifically in transition from the stratified mode to the homogeneous mode. The desired target equivalent ratio TFBYA00 varies sharply whereas the delayed target equivalent ratio TFBYA4 varies gradually, as shown in FIG. 4.

From the thus-determined delayed equivalent ratio TFBYA4, the control system determines a final target equivalent ratio by further performing, on the delayed equivalent ratio, a combustion efficiency correction, a high response correction and a limiting operation in a delay of the fuel cutoff, as mentioned later. Then the control system controls the actual intake air quantity by controlling the opening of the throttle valve 9 and the actual fuel injection quantity by following another routine (not shown) to achieve the final target equivalent ratio.

At a step S7, the control unit 11 determines a desired target EGR rate TGEGR in accordance with one or more engine operating conditions such as the accelerator depression degree or the target torque, and the engine speed, by using a map.

At a step S8, the control unit 11 determines a phase delayed EGR rate TEGRD by performing a phase delay correction on the target EGR rate TGEGR. The ground for the phase delay correction for the EGR rate is similar to the ground for the delayed equivalent ratio TFBYA4. The actual EGR rate lags behind the target EGR rate and a considerable time delay or lag arises between generation of the EGR control signal and a desired effect on the actual EGR rate, because of lag in movement of the EGR valve 14 and the volume of the EGR system from the EGR valve 14 to the cylinder or each cylinder. Therefore, the control unit 11 calculates the phase delayed EGR rate TEGRD by performing a weighted averaging operation in the same manner as the phase delay correction of the target equivalent ratio. In combustion changeover from the stratified combustion mode to the homogeneous combustion mode, the control system of this example stops the EGR by reducing the target EGR rate TGEGR to zero in a manner of a step change as shown in FIG. 4, and the phase delayed EGR rate TEGRD decreases in a gradual manner simulating the actual EGR rate due to the residual EGR gas remaining in the intake system.

At a step S9 following the step S8, the control unit 11 calculates a modified equivalent ratio TFBYG4 modified in consideration of the residual EGR gas quantity. In this example, the modified equivalent ratio TFBYG4 is determined by modifying the delayed equivalent ratio TFBYA4 in accordance with the delayed EGR rate TEGRD according to the following equation.

$$TFBYG4=TFBYA4/(TEGRD+100[\%])$$

Thus, the modified equivalent ratio TFBYG4 is determined by treating the EGR gas as the fresh air. The EGR gas and the fresh air are different in composition such as $O_2$ concentration and $H_2O$ concentration. In ultra lean combustion at a very lean air fuel ratio as in the stratified charge combustion, however, this difference is small and the substitution of the EGR gas for the fresh air in the calculation makes little difference in the combustion. Therefore, it is possible to consider that a combustion limit value of the equivalent ratio TFBYG4 determined by converting the EGR gas quantity into an equivalent intake air quantity is close to a combustion limit value of the equivalent ratio of a lean mixture with no EGR. The delayed equivalent ratio TFBYA4 represents a ratio of the fuel supply quantity to the fresh intake air quantity whereas the modified equivalent ratio TFBYG4 represents a ratio of the fuel supply quantity to the intake gas quantity which is a sum of the fresh intake air quantity and the EGR gas quantity. The modified equivalent ratio TFBYG4 is equal to the delayed equivalent ratio TFBYA4 when the EGR gas quantity is zero and hence the delayed EGR rate TEGRD is zero. The modified equivalent ratio TFBYA4 decreases as the EGR gas quantity increases.

At a step S10, the control unit 11 performs a combustion efficiency correction and a high response torque correction. The combustion efficiency is higher in a lean combustion mode at an air fuel ratio leaner than the theoretical air fuel ratio and in the stratified charge combustion mode than in the homogeneous stoichiometric combustion mode at or near the stoichiometry, and the fuel injection quantity required to produce an equal torque decreases as the combustion efficiency becomes higher. The air quantity is controlled so as to achieve the target equivalent ratio with a base target fuel injection quantity determined by the theoretical air fuel ratio while on the other hand the fuel injection quantity is corrected in accordance with the combustion efficiency. Therefore, the actual equivalent ratio is made smaller than the target equivalent ratio by improvement in the combustion efficiency. The high response torque correction is a correction to increase the equivalent ratio in response to a torque increase. Because of the lag, the control of the intake air quantity is inadequate for achieving a desired target torque in a shift operation of an automatic transmission. Therefore, in the stratified combustion mode, the high response torque correction is performed to correct the equivalent ratio. In this example, the control unit 11 determines a temporary equivalent ratio TFATMP by using the following equation.

$$TFATMP=TFBYG4\times ITAFTMP\times PIPHIT$$

In this equation, ITAFTMP is a correction factor of the combustion efficiency correction, and PIPHIT is a correction factor of the high response torque correction. The temporary equivalent ratio TFATMP increases gradually along a curve below the curve of TFBYA4 as shown in FIG. 4.

At a step S11, the control unit 11 determines whether the engine is in the stratified mode or not, by checking a combustion command flag FSTRR. The control unit 11 proceeds to a step S12 if the stratified mode is now in operation, and terminates this routine if the homogeneous mode is in operation. The combustion command flag FSTRR is set to zero during the homogeneous mode, and to one during the stratified mode, as shown in FIG. 4.

At a step S12, the control unit 11 determines whether a fuel-cut-in-delay is in progress or not. When the vehicle is in a decelerating operation in which conditions for fuel cutoff are satisfied, the control system of this example defers a start of the fuel cutoff until the end of a predetermined delay time from a start of the deceleration in order to mitigate torque shock. The answer of the step S12 is affirmative during the period of this delay time.

If the answer of the step S12 is affirmative, then the control unit 11 proceeds to a step S13 and determines whether the temporary equivalent ratio TFATMP is greater than or equal to a predetermined limit FCSTFMX. If it is, the control unit 11 limits the temporary equivalent ratio TFATMP to the limit FCSTFMX by making TFATMP equal to FCSTFMX at a step S14, and then proceeds to a step S15. This limiting operation of the step S14 helps mitigate a torque shock in the fuel cutoff. If the answer of the step S12 is negative or if TFATMP is smaller than FCSTFMX, the control unit 11 reaches the step S15 bypassing the step S14.

At the step S15, the control unit 11 decides whether to change over the combustion from the stratified mode to the homogeneous mode. In this example, the control unit 11 determines, at the step S15, whether the temporary equivalent ratio TFATMP is equal to or greater than a predetermined threshold TFACH. The control unit 11 proceeds to a step S16 when TFATMP≧TFACH, and terminates this routine without entering the step S16 when TFATMP<TFACH.

At the step S16, the control unit 11 considers that all the conditions are fulfilled for changeover to the homogeneous mode, and commands a changeover of the combustion from the stratified mode to the homogeneous mode by switching the combustion command flag FSTRR to zero. Then, the control system controls the actual combustion in the combustion mode specified by the flag FSTRR.

The control system according to this embodiment can prevent undesired hesitation and engine speed decrease due to misfire which would occur in a hatched region shown in FIG. 4 between TFBYA4 and TFATMP. The control system monitors the temporary equivalent ratio TFATMP based on the modified target equivalent ratio TFBYG4 which more accurately represents the actual condition of the intake gas mixture, and carries out a combustion changeover to the homogeneous mode only after the actual condition enters a region ensuring a stable homogeneous lean combustion. The control system according to the embodiment changes over a combustion mode from the stratified mode to the homogeneous mode at a point A instead of a point B as shown in FIG. 4 by comparing TFATMP with TFACH instead of comparing TFBYA4. At the point B, the actual ratio of the fuel quantity to the total intake gas quantity of the fresh intake air quantity and the EGR gas quantity represented by the temporary equivalent ratio TFATMP is still too low to carry out a changeover to the homogeneous mode properly without misfire. By setting the combustion changing timing at the point A, the control system can minimize undesired influence of the residual EGR gas in transition from the stratified mode with heavy EGR to the homogeneous mode, and achieve a smooth and timely changeover from the stratified mode to the homogeneous mode.

This embodiment eliminates the need for a delay operation for setting a delay time from a stoppage of EGR to a start of changeover of the target equivalent ratio. The control system according to this embodiment can carry out a combustion changeover as soon as possible in response to a changeover request. However, the present invention is applicable to a system having such a delay operation. The influence of the residual EGR gas lingers if the delay time is short, and the determination of the combustion changeover timing based on the modified equivalent ratio TFBYG4 is effective for avoiding the influence of the residual EGR gas.

In the case of a combustion changeover from the stratified charge combustion mode to the homogeneous stoichiometric combustion mode, the control system stops the EGR operation temporarily, and then resumes the EGR operation when the actual equivalent ratio condition enters a predetermined region allowing the EGR operation without deteriorating the stability of the combustion. In this example, the control system increases the EGR quantity to a high level to perform heavy EGR in the stratified mode, reduces the EGR quantity to zero in the homogeneous lean combustion mode and increases the EGR quantity to a moderate level to resume a moderate EGR in the homogeneous rich (stoichiometric) combustion mode.

In the case of a combustion changeover from the homogeneous stoichiometric combustion mode to the stratified combustion mode too, the control system can determine the combustion changeover timing by monitoring the equivalent ratio calculated in consideration of the residual EGR gas, and thereby achieve the combustion changeover responsively and timely.

The thus-constructed control system according to the illustrated example of the present invention determines the combustion changeover timing by monitoring the EGR changeover operation as well as the fuel air ratio changeover operation. The control system produces the first-mode-to-second-mode combustion command signal (such as a step change in FSTRR or other form of a resulting signal) to command the combustion changeover from the first combustion mode to the second combustion mode when a predetermined condition is satisfied by a combustibility indicative parameter (such as TFBYG4 or TFATMP) simulating an actual fuel gas ratio of a fuel quantity to a sum of an intake air quantity and an recirculated exhaust gas quantity. The combustibility parameter is a function of a ratio parameter (such as TFBYA4) representing the actual fuel air ratio controlled by the fuel air ratio changeover operation, and an EGR parameter (such as TEGRD) representing the actual EGR quantity controlled by the EGR changeover operation.

What is claimed is:

1. An engine control apparatus for an internal combustion engine equipped with a combustion system for changing over a combustion condition in the engine among a plurality of combustion modes in accordance with an engine operating condition, and an EGR system for recirculating part of exhaust gas from the engine to an intake air flow into the engine, the engine control apparatus comprising:
   a first section for producing a first-mode-to-second-mode combustion changeover request signal for requesting a changeover from a first combustion mode to a second combustion mode;
   a second section for varying an actual equivalent ratio, in response to the changeover request signal, gradually from a first desired ratio level for the first combustion mode to a second desired ratio level for the second combustion mode;
   a third section for calculating an EGR quantity of the EGR system during a gradual variation of the actual equivalent ratio from the first ratio level to the second ratio level;
   a fourth section for calculating a modified equivalent ratio in consideration of the EGR quantity; and
   a fifth section for changing over the combustion condition from the first combustion mode to the second combustion mode in accordance with the modified equivalent ratio.

2. The engine control apparatus according to claim 1 wherein one of the first and second combustion modes is a stratified charge combustion mode and the other of the first and second combustion modes is a homogeneous charge combustion mode.

3. The engine control apparatus according to claim 2 wherein the third section comprises an EGR control section for causing the EGR system to perform an EGR operation during the stratified combustion mode and to stop the EGR operation immediately upon receipt of the combustion changeover request signal requesting a combustion changeover from the stratified mode to the homogeneous mode.

4. The engine control apparatus according to claim 3 wherein the EGR control section causes the EGR system to resume the EGR operation when the actual equivalent ratio reaches a predetermined level permitting the EGR operation.

5. The engine control apparatus according to claim 1 wherein the third section calculates a desired target EGR quantity, and further calculates a delayed EGR quantity by performing a phase delay correction on the desired target EGR quantity, and the fourth section calculates the modified equivalent ratio in accordance with the delayed EGR quantity.

6. The engine control apparatus according to claim 5 wherein the delayed EGR quantity is a function of the desired target EGR quantity which lags behind the desired target EGR quantity, the second section calculates a delayed target equivalent ratio to vary the actual equivalent ratio gradually from the first desired ratio level to the second desired ratio level in response to the first-mode-to-second-mode combustion changeover request signal, and the fourth section calculates the modified equivalent ratio from the delayed target equivalent ratio and the delayed EGR quantity.

7. An engine control apparatus comprising:
   an internal combustion engine;
   a combustion system for varying an actual fuel air ratio of an air fuel mixture for the engine gradually from a first desired ratio level for a first combustion mode to a second desired ratio level for a second combustion mode in accordance with a fuel air ratio control signal, and changing over an actual combustion condition in the engine from the first combustion mode to the second combustion mode in response to a first-mode-to-second-mode combustion changeover command signal;
   an EGR system for recirculating exhaust gas from the engine to an intake air flow into the engine, and for varying an actual EGR quantity from a first desired EGR quantity for the first combustion mode to a second desired EGR quantity for the second combustion mode in accordance with an EGR control signal;
   a sensor for sensing an engine operating state of the engine; and
   a controller for producing a first-mode-to-second-mode combustion changeover request signal for requesting a combustion changeover from the first combustion mode to the second combustion mode in accordance with the engine operating state sensed by the sensor, for performing a fuel air ratio changeover operation to vary the actual fuel air ratio gradually from the first desired ratio level for the first combustion mode to the second desired ratio level for the second combustion mode by varying the fuel air ratio control signal in response to the changeover request signal, for performing an EGR changeover operation to vary the actual EGR quantity from the first desired EGR quantity to the second desired EGR quantity by varying the EGR control signal in response to the changeover request signal, and for producing the first-mode-to-second-mode combustion command signal to command the combustion changeover from the first combustion mode to the second combustion mode at a combustion changeover timing, the controller determining the combustion changeover timing by monitoring the EGR changeover operation as well as the fuel air ratio changeover operation.

8. The engine control apparatus according to claim 7 wherein the controller produces the first-mode-to-second-mode combustion command signal to command the combustion changeover from the first combustion mode to the second combustion mode when a combustibility parameter fulfills a predetermined condition, the combustibility parameter is a variable representing a fuel gas ratio of a fuel quantity to a sum of an intake air quantity and an recirculated exhaust gas quantity, and the controller determines the combustibility parameter in accordance with a ratio parameter representing the actual fuel air ratio controlled by the fuel air ratio changeover operation, and an EGR parameter representing the actual EGR quantity controlled by the EGR changeover operation.

9. The engine control apparatus as claimed in claim 8:
wherein the ratio parameter is a delayed target equivalent ratio, the controller determines the delayed target equivalent ratio to vary the actual fuel air ratio gradually from the first ratio level to the second ratio level and the controller produces the fuel air ratio control signal in accordance with the delayed target equivalent ratio;
wherein the EGR parameter is an estimated EGR quantity, and the controller produces the EGR control signal in accordance with a desired target EGR quantity and changes the desired target EGR quantity from the first desired quantity to the second desired quantity to change the actual EGR quantity from the first desired EGR quantity to the second desired EGR quantity in response to the changeover request signal, and calculates the estimated EGR quantity so that the estimated EGR quantity varies from the first desired quantity toward the second desired quantity in a gradual pace lagging behind the desired target EGR quantity; and
wherein the controller calculates an estimated fuel gas ratio in accordance with the delayed target equivalent ratio and the estimated EGR quantity, and determines the combustibility parameter in accordance with the estimated fuel gas ratio.

10. The engine control system according to claim 9 wherein the estimated fuel gas ratio is equal to the delayed equivalent ratio when the estimated EGR quantity is zero, and the estimated fuel gas ratio decreases as the estimated EGR quantity increases.

11. The engine control system according to claim 10 wherein the estimated EGR quantity represents a ratio of a recirculated exhaust gas quantity to an intake air quantity, and the estimated fuel gas ratio is equal to the delayed equivalent ratio divided by a sum of one and the estimated EGR quantity.

12. The engine control system according to claim 9 wherein the second desired EGR quantity for the second combustion mode is smaller than the first desired EGR quantity for the first combustion mode, and the second desired ratio level for the second combustion mode is higher than the first desired ratio level for the first combustion mode.

13. The engine control system according to claim 12 wherein the first combustion mode is a stratified charge combustion mode and the second combustion mode is a homogeneous charge combustion mode.

14. The engine control system according to claim 13 wherein the second desired EGR quantity is equal to a minimum setting of the EGR system, and wherein the controller reduces the actual EGR quantity from the first desired EGR quantity to the second desired EGR quantity immediately upon receipt of the first-mode-to-second-mode changeover request signal.

15. The engine control system according to claim 14 wherein the controller increases the actual EGR quantity from the second desired EGR quantity to a third desired EGR quantity greater than the second desired EGR quantity when the combustibility parameter becomes equal to or greater than a predetermined level during the homogeneous combustion mode.

16. The engine control system according to claim 7 wherein the combustion system comprises an intake system for controlling an actual intake air quantity, a fuel injection system for injecting fuel directly into a combustion chamber of the engine, and for changing an actual fuel injection timing from a first desired injection timing for the first mode to a second desired injection timing for the second mode in response to the changeover command signal, and the sensor comprises a first sensor for sensing an engine speed condition of the engine, and a second sensor for sensing an engine load condition of the engine.

17. An engine control process for an internal combustion engine equipped with a combustion system for changing over a combustion condition in the engine among a plurality of combustion modes in accordance with an engine operating condition, and an EGR system for recirculating part of exhaust gas from the engine to an intake air flow into the engine, the engine control process comprising:
a first step for producing a first-mode-to-second-mode combustion changeover request signal for requesting a changeover from a first combustion mode to a second combustion mode;
a second step for varying an actual equivalent ratio, in response to the changeover request signal, gradually from a first desired ratio level for the first combustion mode to a second desired ratio level for the second combustion mode;
a third step for calculating an EGR quantity of the EGR system during a gradual variation of the actual equivalent ratio from the first ratio level to the second ratio level;
a fourth step for calculating a modified equivalent ratio in consideration of the EGR quantity; and
a fifth step for changing over the combustion condition from the first combustion mode to the second combustion mode in accordance with the modified equivalent ratio.

18. The engine control process according to claim 17:
wherein one of the first and second combustion modes is a stratified charge combustion mode and the other of the first and second combustion modes is a homogeneous charge combustion mode; and
wherein the third step comprises a first sub-step for causing the EGR system to perform an EGR operation during the stratified combustion mode and to stop the EGR operation immediately upon receipt of the combustion changeover request signal requesting a combustion changeover from the stratified mode to the homogeneous mode.

19. The engine control process according to claim 17 wherein the third step comprises an operation for calculating a desired target EGR quantity, and an operation for further calculating a delayed EGR quantity by performing a phase delay correction on the desired target EGR quantity, and the fourth step comprises an operation for calculating the modified equivalent ratio in accordance with the delayed EGR quantity; and wherein the delayed EGR quantity is a function of the desired target EGR quantity which lags behind the desired target EGR quantity, the second step comprises a sub-step for calculating a delayed target equivalent ratio to vary the actual equivalent ratio gradually from the first desired ratio level to the second desired ratio level in response to the first-mode-to-second-mode combustion changeover request signal, and the fourth step comprises a sub-step for calculating the modified equivalent ratio from the delayed target equivalent ratio and the delayed EGR quantity.

* * * * *